(12) United States Patent
von Wimmersperg

(10) Patent No.: US 8,119,098 B2
(45) Date of Patent: Feb. 21, 2012

(54) PROCESS FOR CONVERTING CARBON DIOXIDE FROM COAL UTILIZATION TO A SOLID ASH

(75) Inventor: Udo von Wimmersperg, Bellport, NY (US); Laurinel Owen, legal representative, Bellport, NY (US)

(73) Assignee: HCE, LLC, Oakton, VA (US)

( * ) Notice: Subject to any disclaimer, the term of this patent is extended or adjusted under 35 U.S.C. 154(b) by 79 days.

(21) Appl. No.: 12/684,177

(22) Filed: Jan. 8, 2010

(65) Prior Publication Data
US 2010/0178239 A1 Jul. 15, 2010

Related U.S. Application Data

(60) Provisional application No. 61/143,781, filed on Jan. 10, 2009.

(51) Int. Cl.
*C01B 3/02* (2006.01)
*C01B 3/26* (2006.01)
(52) U.S. Cl. ...................................... 423/648.1; 423/652
(58) Field of Classification Search ................. 423/648.1
See application file for complete search history.

(56) References Cited

U.S. PATENT DOCUMENTS

| 4,274,839 | A | * | 6/1981 | Leas | ............................... | 48/202 |
| 4,280,893 | A | * | 7/1981 | Leas | ............................... | 208/408 |
| 6,669,917 | B2 | | 12/2003 | Lyon | | |
| 7,282,189 | B2 | * | 10/2007 | Zauderer | ....................... | 423/220 |

* cited by examiner

*Primary Examiner* — Melvin Mayes
*Assistant Examiner* — Kenneth Vaden
(74) *Attorney, Agent, or Firm* — Louis Ventre, Jr.

(57) ABSTRACT

A process for conversion of coal in a reaction vessel comprises steps of: admixing coal and powdered alumina clay to form reactants; injecting the reactants with a high-pressure steam jet into the reaction vessel; and producing aluminum oxalate ash and hydrogen. Preferably, the reaction vessel is pressurized to maximize the production of aluminum oxalate and hydrogen. Optionally, the process includes adding calcium carbonate if not present in the clay. The reactants in the reaction vessel are typically maintained a temperature of about 2,000 degrees Kelvin and a pressure of about 1 mega Pascals. To save energy, the process may include preheating water with the aluminum oxalate ash to aid in creating pressurized steam. The hydrogen may be mixed with air and burned in a combustion chamber, such as is found within a gas turbine-generator unit to produce electricity. Optionally the reactants may include an aqueous sodium hydroxide.

11 Claims, 2 Drawing Sheets

PROCESS FOR CONVERTING CARBON DIOXIDE FROM COAL UTILIZATION TO A SOLID ASH

CROSS-REFERENCE TO RELATED APPLICATION

This application claims the benefit of U.S. Provisional Application No. 61/143,781, filed 10 Jan. 2009, which is hereby incorporated by reference herein.

TECHNICAL FIELD

In the field of chemistry of inorganic compounds, a process of zero carbon dioxide emission in coal use by producing a solid ash from carbon dioxide gas by a chemical reaction.

BACKGROUND ART

Carbon dioxide is a greenhouse gases produced during the combustion of coal power plants. Its effect on climate change has led to international political action aimed at limiting the amount of carbon dioxide produced around the world. The United States is presently considering a national emission trading program, under which industries with higher emission levels of greenhouse gases can buy "emission credits" from others that are not emitting their allotted levels of greenhouse gases.

Thus, there is growing political will to reduce the levels of carbon dioxide produced by coal-fired power plants. New methods that to reduce the emissions of carbon dioxide are needed.

The present invention chemically converts the carbon dioxide to a solid, eliminating its emission during the process of converting coal to steam or electricity. It is different from most if not all existing methods, which treat the carbon dioxide after it is emitted from the conversion process. For example, one well known process involves sequestration of the gaseous carbon dioxide produced by coal-fired and other power plants by injection in underground reservoirs.

Post process solidification by a different process is also known. For example, one existing method of carbon dioxide sequestration involves reacting the carbon dioxide discharged from the combustion process with large quantities of calcium oxide and magnesium oxide, then burying the resulting carbonates. Treating carbon dioxide after it is emitted from the process eventually leads to releasing some of it to the environment during compression, transportation, treatment and disposal.

The prior art includes conversion of the coal to methane in a gasification process followed by capturing the produced carbon dioxide with calcium oxide. The calcium oxide is calcined from mined mineral. However, one of the key technical development issues with this proposed method is a fuel cell that is tolerant of sulfur compounds released by the coal gasification, and, as such, the fuel cell may be more difficult to develop than fuel cells fired with methane, i.e., natural gas (although natural gas also contains minute quantities of sulfur). The present invention minimizes the sulfur compounds and other contaminants by forming solid ash.

Another issue with this prior art is the possibility of inefficient heat transfer between many steps in this complex system, which may sharply reduce the feasibility of this cycle. Additionally, since no large central station power plants with methane fuel cells are in existence, the probability of developing even a full scale prototype plant for this much more complicated coal fired system in the near future is very small, and the possibility of building enough power plants of this type to meaningfully reduce carbon dioxide emissions is even smaller.

SUMMARY OF INVENTION

A process for conversion of coal in a reaction vessel comprises steps of: admixing coal and powdered alumina clay to form reactants; injecting the reactants with a high-pressure steam jet into the reaction vessel in a reducing environment; and producing aluminum oxalate ash and hydrogen. Preferably, the reaction vessel is pressurized to maximize the production of aluminum oxalate and hydrogen. Optionally, the process includes adding calcium carbonate if not present in the clay. The reactants in the reaction vessel are typically maintained a temperature of about 2,000 degrees Kelvin and a pressure of about 1 mega Pascals. To save energy, the process may include preheating water with the aluminum oxalate ash to aid in creating pressurized steam. The hydrogen may be mixed with air and burned in a combustion chamber, such as is found within a gas turbine-generator unit to produce electricity. Optionally the reactants may include an aqueous sodium hydroxide.

Technical Problem

Past technology attempting to solve the problems associated with the emission of carbon dioxide involves processes that initially produce the gas and then attempt to prevent the release of carbon dioxide by flue gas treatment or sequestration of the gas, for example by underground injection. Existing processes that attempt to absorb carbon dioxide on calcium oxide are seriously flawed since naturally occurring calcium is already associated with carbon dioxide in the form of the carbonate, and the preparation of calcium oxide would entail the emission of carbon dioxide in the first place. In addition, these treatment methods are costly and can diminish energy efficiency.

Various proposals utilize naturally occurring calcium carbonate to capture partially-combusted carbon in the form of carbon monoxide, producing calcium oxalate. The calcium oxalate is practically insoluble in water, and would make a stable depository. However, compared to the complete oxidation of carbon, the energy yield from these processes are reduced to 45 percent.

Solution to Problem

The solution is the solidification by chemical conversion of carbon dioxide into an ash during the coal conversion process. The solidification process creates a stable, insoluble, and non-toxic ash that can be deposited in a safe, controlled and accessible manner, such as in backfills at coal mines. The invention makes use of ubiquitously procurable clays of low cost.

The solution eliminates the emission of carbon dioxide into the atmosphere when coal is used as a source of energy, for example in an electricity generating plant by capturing the oxides of carbon together with other potential pollutants such as sulfur and mercury in the form of a solid ash.

Advantageous Effects of Invention

This invention has advantages in energy production from coal and other carbon containing fuels in a process that is not only environmentally benign, but has intrinsic economic benefit since the ash formation is expected to enhance the energy yield obtainable from coal by 15 percent.

In contrast to costly schemes that abandon large inventories of sequestrated carbon dioxide in deep aquifers, the present invention's ash process is environmentally safe and economical.

A preferred embodiment of the invention provides a transition to a future hydrogen economy, by producing hydrogen via the reduction of water with coal. This embodiment not only offers flexibility in applications but also optimizes thermodynamic efficiency and minimizes capital investment.

BRIEF DESCRIPTION OF DRAWINGS

The drawings show preferred embodiments of the process comprising the invention.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention. For example, the steps in the method of the invention may be performed in any order to produce the products.

Figure 1:
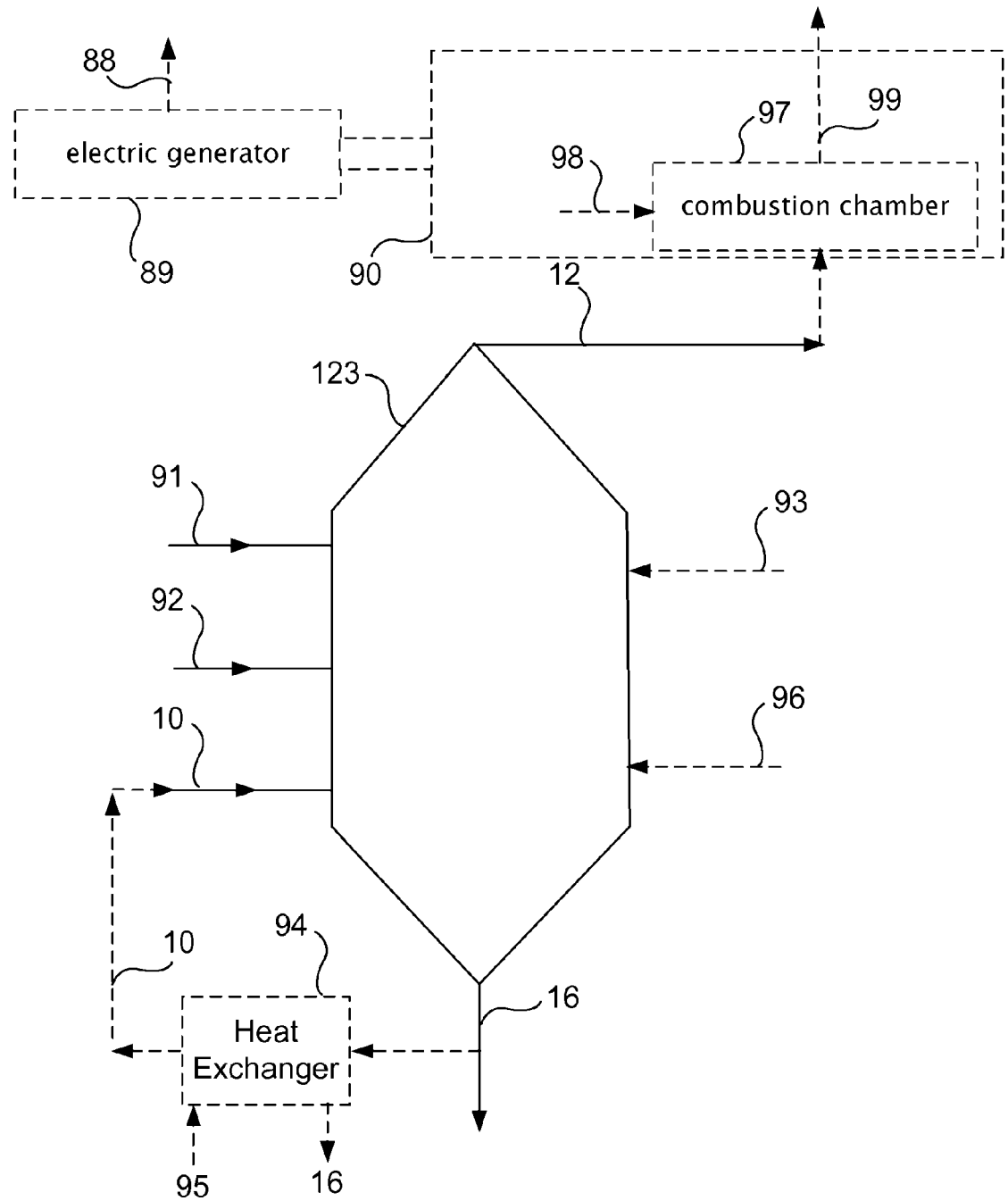
FIG. 1 is a diagram of a preferred embodiment of the process.

A preferred embodiment of the process is shown in FIG. 1, which illustrates the principles of the process. For brevity, in the chemical reactions quoted below, coal is equivalent to carbon. Dashed lines in the figures indicate optional steps or components.

A reaction vessel (123) is fed powdered coal (91), powdered alumina clay (92); and pressurized steam (10). Aluminum oxalate ash (16) in solid form and hydrogen (12) gas are produced.

Thus, the process for conversion of coal includes steps of providing a reaction vessel (123) with a reducing environment; admixing powdered coal and powdered alumina clay (92) to form reactants; creating pressurized steam (10); injecting the reactants with the pressurized steam (10) into the reaction vessel (123); and, producing aluminum oxalate ash (6) and hydrogen (12).

A preferred step is pressurizing the reactants in the reaction vessel (123) to a temperature and pressure that maximizes the production of aluminum oxalate ash (16) and hydrogen (12) at the operating temperature within the reaction vessel (123). This is achieved by maintaining a pressure within the reaction vessel (123) at about 1 mega Pascals while maintaining a temperature within the reaction vessel (123) at about 2,000 degrees Kelvin.

The powdered alumina clay (92) found in most deposits will typically include calcium carbonate, which can capture the sulfur contaminants in the coal and increase the efficiency of the chemical reaction in the process. To optimize the process for clays that have little or no calcium carbonate, the process may include a step of adding calcium carbonate (93) to the reactants.

To further optimize energy efficiency of the process, a step may include preheating water (95) with the aluminum oxalate ash (16) to aid in creating pressurized steam (10). A heat exchanger (93) may be used for this purpose.

Once hydrogen (12) is produced, the process optionally includes further steps of: providing a combustion chamber (97); admixing air (98) with the hydrogen (12) in the combustion chamber (97); and, igniting the mixture to produce energy (99). Optionally, the process includes a step of providing a gas turbine wherein the combustion chamber (97) is within the gas turbine (90). Optionally, the process includes a step of providing an electric generator (89) attached to the gas turbine (90); and, producing electricity (88). A hydrogen fuel cell may also be used to produce electricity instead of a combustion chamber, or the hydrogen may be used for other processes well known in the art.

Optionally, the process includes a step of adding aqueous sodium hydroxide (96) to the reactants. This is an alternative to solid-gas reactions involved in the gasification of the coal, and the formation of aluminum oxalate are gas-solid reactions. This alternative makes it possible to invoke differential solubilities in a 'wet' chemistry version of the ash process. This alternative would be suitable for retrofitting existing utilities. Basic to such a configuration are alkaline leaching facilities capable of dissolving alumina, and the recycling of the sodium inventory. An example of ash precipitation from solution would entail the capture of carbon oxides in aqueous sodium hydroxide:

$$NaOH+CO_2+CO\rightarrow NaHC_2O_4$$

At 100° C. the solubility of sodium hydrogen oxalate is 21% by mass. Addition of soluble alumina at elevated pH shifts the equilibrium towards precipitation of insoluble aluminum oxalate:

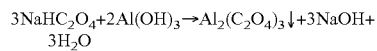

$$3NaHC_2O_4+2Al(OH)_3\rightarrow Al_2(C_2O_4)_3\downarrow +3NaOH+3H_2O$$

As noted above for the preferred embodiment, both the gasification of the coal, and the formation of aluminum oxalate are gas-solid reactions, which are promoted by maximization of the solid surface areas. This preferred process represents the reaction with alumina to capture carbon dioxide in the form of aluminum oxalate:

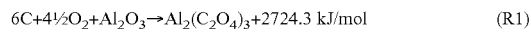

$$6C+4\tfrac{1}{2}O_2+Al_2O_3\rightarrow Al_2(C_2O_4)_3+2724.3 \text{ kJ/mol} \qquad (R1)$$

The number in parenthesis in the equation is the equation or reaction number for concise reference. For this reaction (R1), based on the calculated free energy of formation of aluminum oxalate $\Delta_f H^0 = -4400$ kJ/mol (see below), the energy yield per mol of carbon is 2724.3/6=454.1 kJ, representing a net gain of 15 percent over what can be attained when gaseous carbon dioxide is vented.

This process is viable on the scale required for worldwide coal utilization because alumina is a major constituent of clays, and is cheap and globally in abundant supply. Aluminum itself constitutes more than 8% of the earth's crust, and is not naturally associated with carbon dioxide.

It is desirable to carry out reaction (R1) with oxygen rather than air, because heat losses and the escape of pollutants through a stack via the nitrogen returning to the atmosphere, are then eliminated. This approach would, however, add costs for the separation of oxygen from air.

A better way is to use the carbon to reduce water:

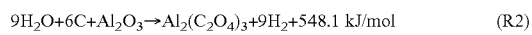

$$9H_2O+6C+Al_2O_3\rightarrow Al_2(C_2O_4)_3+9H_2+548.1 \text{ kJ/mol} \qquad (R2)$$

Subsequent combustion of the hydrogen with atmospheric oxygen yields:

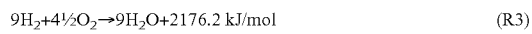

$$9H_2+4\tfrac{1}{2}O_2\rightarrow 9H_2O+2176.2 \text{ kJ/mol} \qquad (R3)$$

Summing (R2) and (R3), yields the 2724.3 kJ/mol of reaction (R1).

Reaction (R2) represents a combination of the well known steam-carbon and water-gas shift reactions, $$9H_2O + 6C \rightarrow 9H_2 + 3CO_2 + 3CO - 664.2 \text{ kJ/mol} \tag{R4}$$

carried out in the presence of alumina. An immediate advantage apparent in this approach is that gas-from-gas separations are not required since only solid ash (aluminum oxalate) and hydrogen are formed. It should be noted that while reaction (R4) is endothermic, reaction (R2) liberates hydrogen exothermally. Optimal energy efficiency can be attained if pressurized hot hydrogen from the reaction vessel is directly co-injected with air into the combustion chamber of a gas turbine that drives an electric generator. As noted above, process water for reaction (R2) can be preheated by contact with expelled hot ash.

Figure 2:
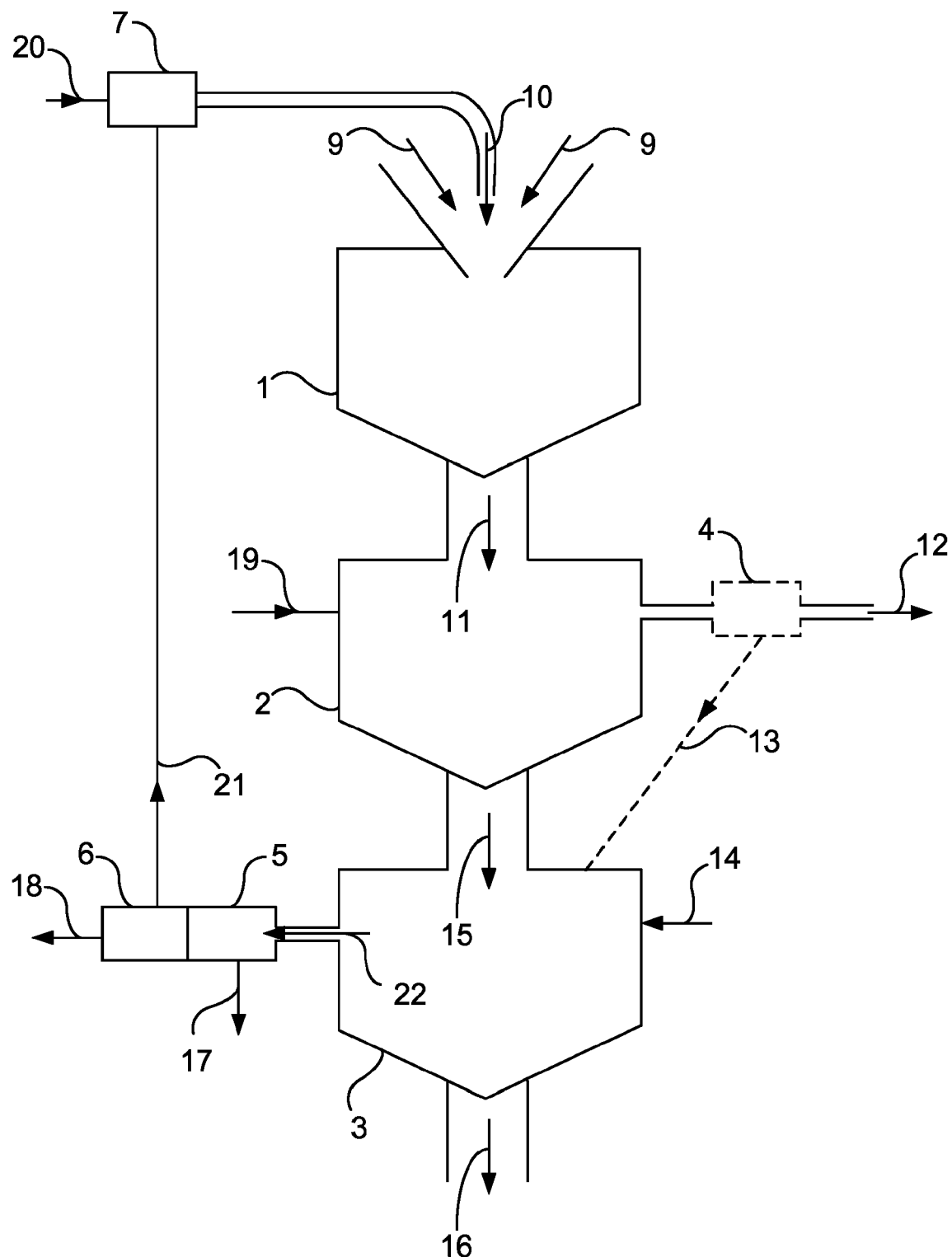
FIG. 2 is a diagram of a preferred embodiment of an energy facility using the process.

FIG. 2 is a diagram of a preferred embodiment of a zero-emission coal-utilization plant. Incoming water (20) is injected into a pre-heater (7) to create a superheated entrainment jet of steam (10), which flows into a gasification reactor (1). The gasification reactor (1) preferably operates at about 2,000 degrees Kelvin at about 1 mega Pascals pressure.

The superheated entrainment jet of steam (10) is combined with powdered coal and clay (9), typically using funnel (8), and inputted into the gasification unit (1), which preferably operates at 2,000 degrees Kelvin at about 1 mega Pascals pressure. Reactive gas and solids (11) are formed in the gasification reactor (1) and are delivered from the gasification reactor (1) to a zero-emission coal-utilization reactor (2).

Water (19) is injected into the zero-emission coal-utilization reactor (2), which lowers the temperature and raises the pressure within the zero-emission coal-utilization reactor (2), preferably to 600 degrees Kelvin and 22 mega Pascals pressure. Hydrogen (12) is produced from the zero-emission coal-utilization reactor (2) and preferably flows through a filter or purifier (4), which removes contaminants (13) and produces hydrogen (12) as a purified gas product. Contaminants (13) removed from the hydrogen are delivered to an ash heat-recovery unit (3) for recombination with ash. Aluminum oxalate (15) and contaminants (13) are delivered from the zero-emission coal-utilization reactor (2) to the ash heat-recovery unit (3).

Water (14) is injected into the ash heat-recovery unit (3) to create steam for a turbine (5) and generator (6). Ash (16), which is reduced in temperature by the ash heat-recovery unit (3), is emitted as a product from the ash heat-recovery unit (3).

The steam from the ash heat-recovery unit (3) flows to an auxiliary turbine (5) and generator (6) to produce electricity (18). Water (17) condensed from extraction of the heat energy in the turbine (5) is produced. Electric power (21) from the generator (6) is delivered to the pre-heater (7). Electricity (18) produced by the generator (6) yields a net power out for the plant.

Thus, the process shown in FIG. 2 is for conversion of coal and comprises the steps of: injecting water (20) into a pre-heater (7) to create a jet of superheated steam (10); flowing the superheated steam (10) into a gasification reactor (1); admixing the superheated steam (10) with powdered coal and clay (9) to form reactants; injecting the reactants into the gasification reactor (1); delivering reactive gas and solids formed in the gasification reactor (1) to a zero-emission coal-utilization reactor (2); injecting water (19) into the zero-emission coal-utilization reactor (2); producing hydrogen (12) from the zero-emission coal-utilization reactor (2); delivering aluminum oxalate (15) from the zero-emission coal-utilization reactor (2) to an ash heat-recovery unit (3); injecting water (14) into the ash heat-recovery unit (3) to create steam (22); producing ash (16) as a product of the ash heat-recovery unit (3); flowing steam (22) from the ash heat-recovery unit (3) through an auxiliary turbine (5) and generator (6) unit (also referred to in combination as a turbine-generator unit) to produce electricity (18); condensing the steam (22), which produces liquid water (17), flowing out of the auxiliary turbine-generator unit; and, using a portion of the electricity (21) to power the pre-heater (7).

Optionally, this process for conversion of coal includes the step of operating the gasification reactor (1) at about 2,000 degrees Kelvin at about 1 mega Pascals pressure.

Optionally, this process for conversion of coal includes the step of limiting the water injected into the zero-emission coal-utilization reactor (2) to a quantity that lowers the temperature and raises the pressure within the zero-emission coal-utilization reactor (2) to a temperature of 600 degrees Kelvin and a pressure of 22 mega Pascals.

Optionally, this process for conversion of coal includes step of flowing the hydrogen (12) through a purifier (4) to remove contaminants (13).

Optionally, this process for conversion of coal includes step of delivering the contaminants (13) to the ash heat-recovery unit (3) for recombination with ash.

The powdered clay (9) requirement entails minimizing the cost of procurement and transportation of the feedstock, the cost of disposing of alumina oxalate (15) and contaminants (13) waste produced, and the cost of maintenance and investment to build the plant.

The powdered clay (9) requirements for aluminum oxalate ash formation in the process of the present invention are less stringent than for aluminum production, since purity of the end product is not at issue. Local sources of ordinary clays containing both alumina and silica would serve as feedstock for ash formation, minimizing procurement and transportation costs.

The association of alumina with silica in naturally occurring clays entails bonds comprising a binding energy. Breaking such bonds would diminish the energy yield resulting from ash formation by a small amount. Andalusite offers a typical example of powdered clay (9) composition:

$$Al_2O_3 \cdot SiO_2 \rightarrow Al_2O_3 + SiO_2 - 165.5 \text{ kJ/mol}$$

While this energy deficit is of little consequence in the first place, the process of the invention enables it to be recouped under conditions that lead to a comparable bonding between the alumina oxalate (15) and silica in the ash (16) formed in the process. In an analogous way to what occurs with silica, the association of alumina with water yields hydrated compounds, such as those making up bauxite minerals. Here too, an energy penalty is incurred as a result of binding the water. However, this energy is also recouped in the ash (16) final product, with the alumina oxalate (15) typically forming the tetrahydrate.

Published values of the physical properties of alumina oxalate (15) are incomplete. This is so despite the commercial availability of the material, which finds application, for instance, as a dental adhesive. Its insolubility in water is important for stable deposition of the ash (16). In the absence of data for the free enthalpy of formation of alumina oxalate (15), the following is an estimated interpolation:

$$\Delta_f H^0[Al_2(C_2O_4)_3] = \Delta_f H^0[Al_2O_3] + 3\Delta_f H^0[Na_2C_2O_4] - 3\Delta_f H^0[Na_2O]$$

$$\Delta_f H^0[Al_2O_3] = -1675.7 \text{ kJ/mol}$$

$$\Delta_f H^0[Na_2C_2O_4] = -1322.3 \text{ kJ/mol}$$

$$\Delta_f H^0[Na_2O] = -414.2 \text{ kJ/mol}$$

$$\Rightarrow \Delta_f H^0[Al_2(C_2O_4)_3] = -4400 \text{ kJ/mol}$$

It is recognized that current methods available for the calculation of free energies are inherently unreliable. The targeted interpolation is considered a more reliable estimate than attempts to obtain fits in terms of generalized descriptors, using large tabulations of experimental values for unrelated compounds.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the energy industry.

What is claimed is:

1. A process for conversion of coal comprising the steps of:
providing a reaction vessel with a reducing environment;
admixing powdered coal and powdered alumina clay to form reactants;
creating pressurized steam;
injecting the reactants with the pressurized steam into the reaction vessel;
maintaining a temperature within the reaction vessel at about 2,000 degrees Kelvin; and,
maintaining a pressure within the reaction vessel at about 1 mega Pascals;
producing aluminum oxalate ash and hydrogen.

2. The process of claim 1, further comprising the step of adding calcium carbonate to the reaction vessel.

3. The process of claim 1, further comprising the step of preheating water with the aluminum oxalate ash to aid in creating pressurized steam.

4. The process of claim 1, further comprising the steps of:
providing a combustion chamber;
admixing air with the hydrogen in the combustion chamber; and,
igniting the mixture to produce energy.

5. The process of claim 4, further comprising the steps of:
providing a gas turbine wherein the combustion chamber is within the gas turbine;
providing an electric generator attached to the gas turbine; and,
producing electricity.

6. The process of claim 1, further comprising the step of adding aqueous sodium hydroxide to the reactants.

7. A process for conversion of coal comprising the steps of:
injecting water into a pre-heater to create a jet of superheated steam;
admixing the superheated steam with powdered coal and clay to form reactants;
injecting the reactants into the gasification reactor;
delivering reactive gas and solids formed in the gasification reactor to a zero-emission coal-utilization reactor;
injecting water into the zero-emission coal-utilization reactor;
producing hydrogen from the zero-emission coal-utilization reactor;
delivering aluminum oxalate from the zero-emission coal-utilization reactor to an ash heat-recovery unit;
injecting water into the ash heat-recovery unit to create steam;
producing ash as a product of the ash heat-recovery unit;
flowing steam from the ash heat-recovery unit through an auxiliary turbine-generator unit to produce electricity;
condensing the steam flowing out of the auxiliary turbine-generator unit; and,
using a portion of the electricity to power the pre-heater.

8. The process of claim 7, further comprising the step of operating the gasification reactor at about 2,000 degrees Kelvin at about 1 mega Pascals pressure.

9. The process of claim 8, further comprising the step of limiting the water injected into the zero-emission coal-utilization reactor to a quantity that lowers the temperature and raises the pressure within the zero-emission coal-utilization reactor to a temperature of 600 degrees Kelvin and a pressure of 22 mega Pascals.

10. The process of claim 7, further comprising the step of flowing the hydrogen through a purifier to remove contaminants.

11. The process of claim 10, further comprising the step of delivering the contaminants to the ash heat-recovery unit for recombination with ash.

* * * * *